May 12, 1970     R. R. SZAJ ET AL     3,511,176

REFUSE PACKING MECHANISM

Filed May 2, 1968     5 Sheets-Sheet 1

INVENTORS
Raymond R. Szaj
Luellyn F. Sexton Jr.
BY
Morsell & Morsell
ATTORNEYS

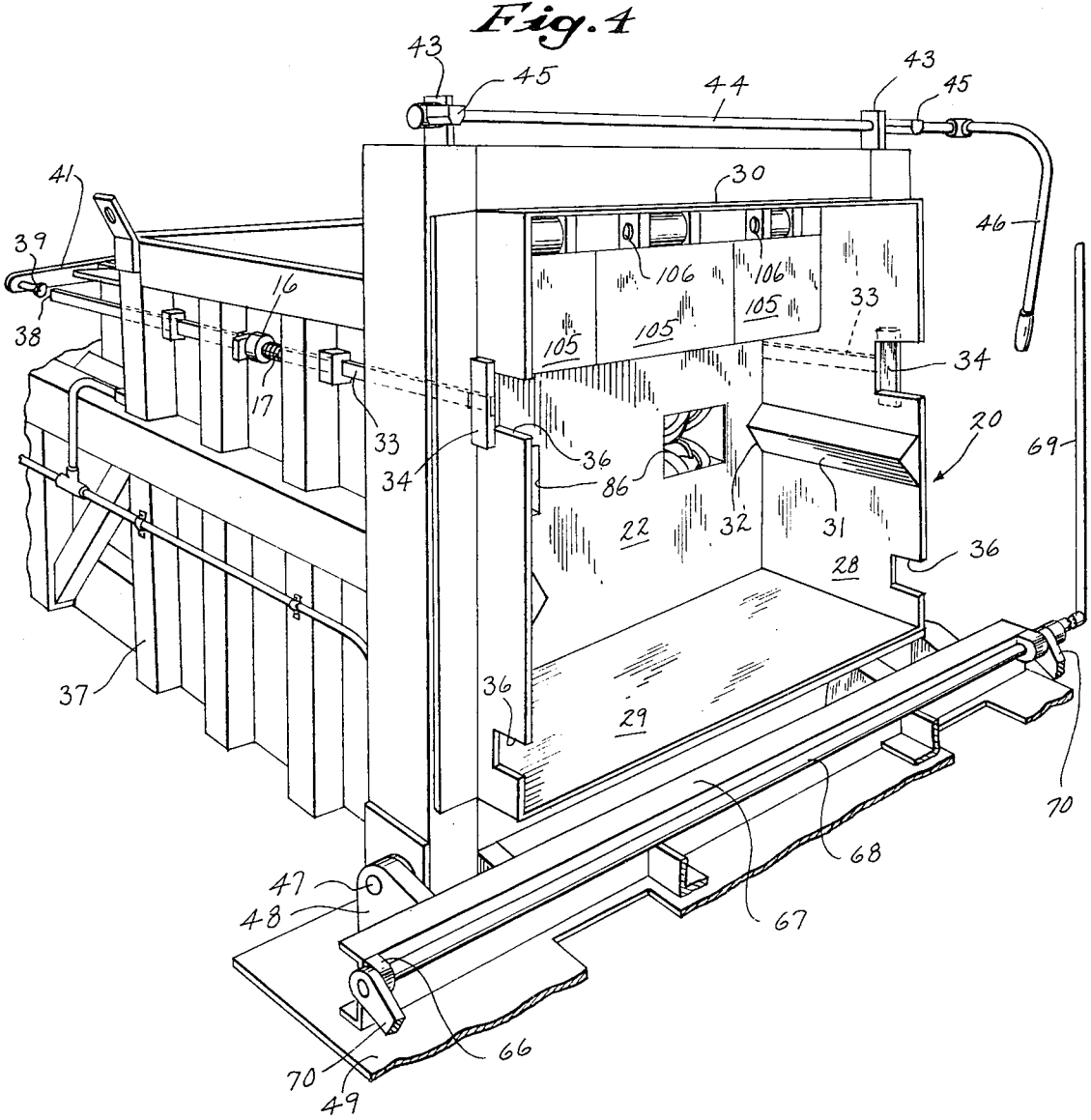
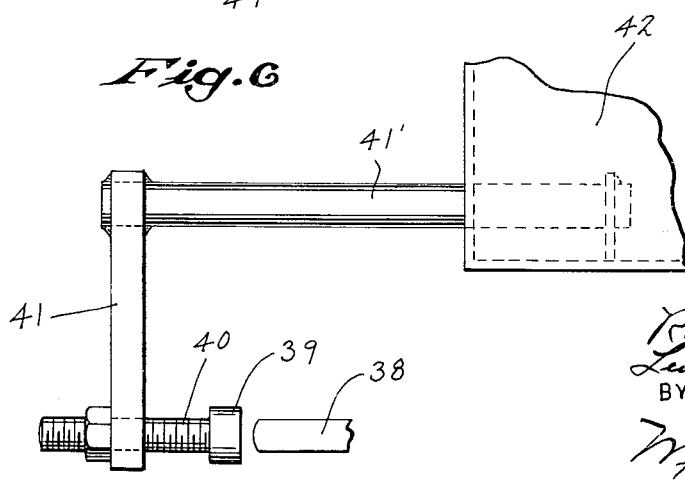

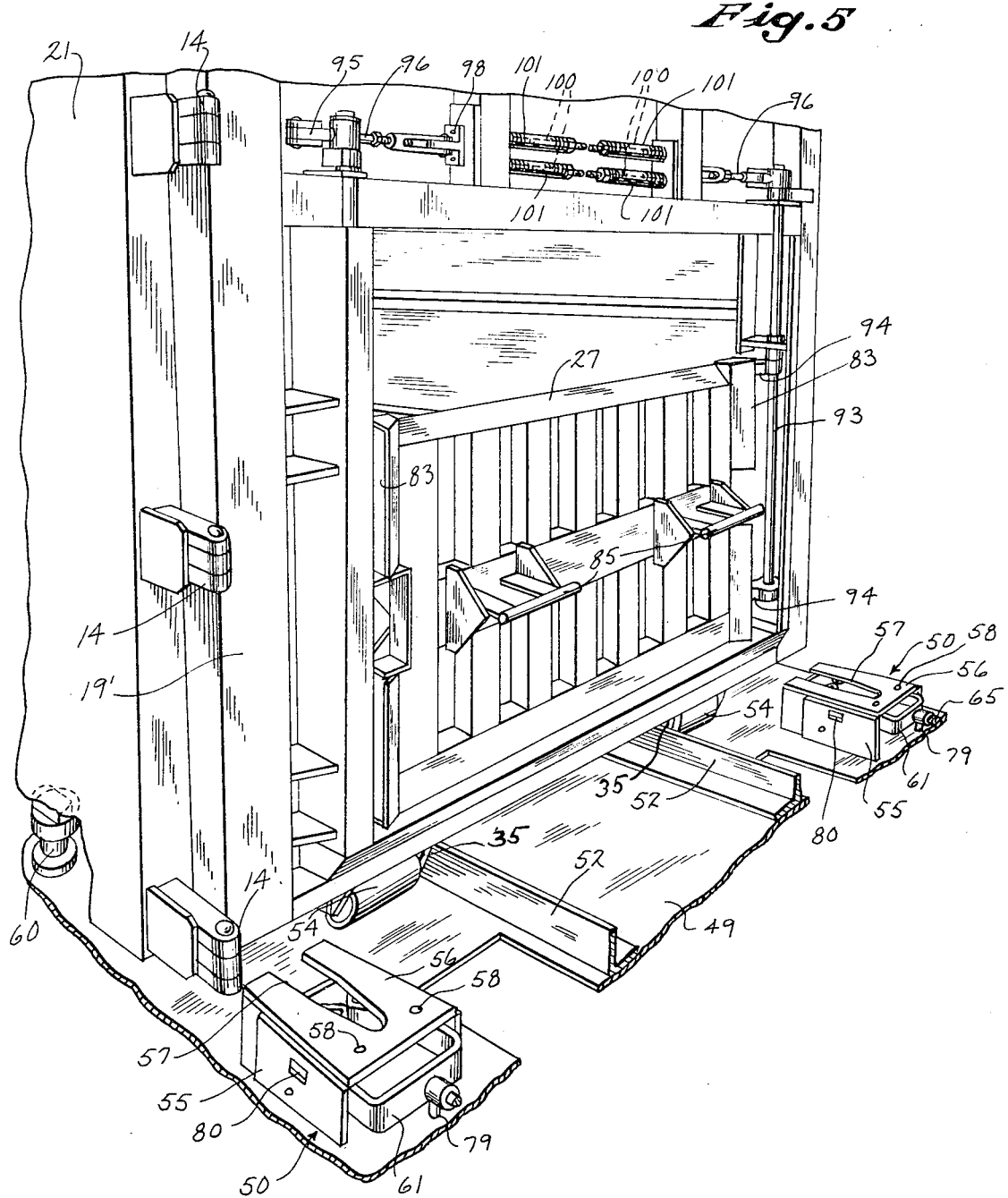

INVENTORS
Raymond R. Szaj
Lewellyn F. Sexton Jr.
BY
Monsell & Monsell
ATTORNEYS

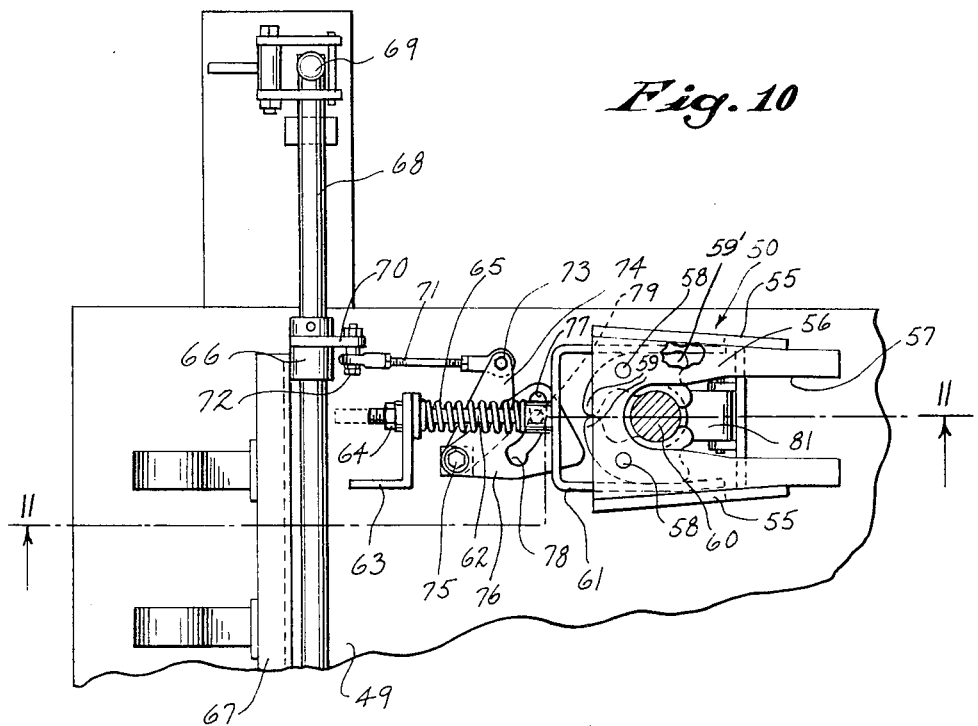
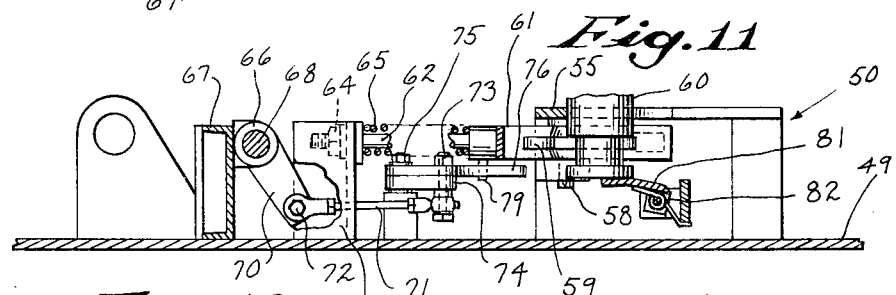
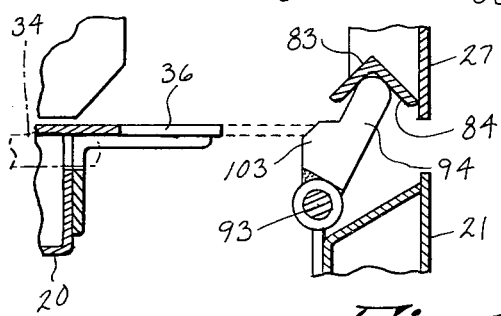
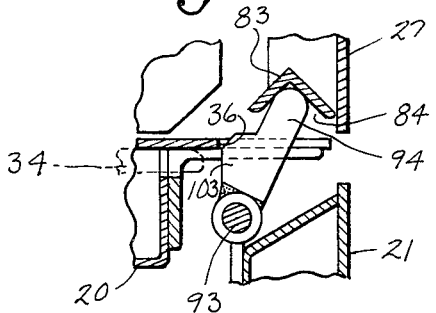
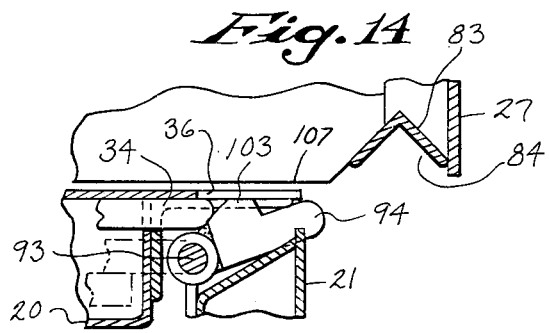

United States Patent Office 3,511,176
Patented May 12, 1970

3,511,176
REFUSE PACKING MECHANISM
Raymond R. Szaj, Hales Corners, and Llewellyn F. Sexton, Jr., Milwaukee, Wis., assignors to The Heil Co., Milwaukee, Wis., a corporation of Wisconsin
Filed May 2, 1968, Ser. No. 726,152
Int. Cl. B30b 15/06
U.S. Cl. 100—229                    20 Claims

ABSTRACT OF THE DISCLOSURE

A movable refuse container having a front opening and having traction rollers which are guided toward a packing unit by guide rails projecting from the latter, there being latches connected to the packer which automatically engage king pins projecting from the bottom of the container to latch the container to the packer when the container has been moved to operative position. A retainer plate with grooved sides is removably connected to the packer plate to move with the latter during the packing operation. Swingable flappers on the sides of the container opening are locked in inoperative position during the packing cycle, but are released to engage the side grooves of the retainer plate when the packing has been completed, to maintain refuse in the container. Relative movement between the packer plate and the container will automatically release the flappers from the retainer plate grooves at the start of a packing cycle to permit the retainer plate to be transferred to the front of the packer plate.

BACKGROUND OF THE INVENTION

Field of the invention

The present invention pertains to mechanism for hydraulically packing industrial, commercial and institutional refuse into transportable containers so that the refuse can be readily hauled away.

Description of the prior art

It has heretofore been proposed to move portable refuse containers into operative relationship with a stationary hydraulic packer, to pack refuse into a portable container, and to thereafter haul the container away for dumping. Heretofore problems have been encountered in bringing about alignment of the container with the refuse packer and in making a satisfactory connection between the container and packing unit. Arrangements heretofore proposed have been complicated, and it has been necessary for workmen to manipulate hooks or latches on both sides in order to effect a connection and to also release these hooks or latches. It has also heretofore been proposed to transfer a retainer plate from the front of the hydraulic packer plate to a position over the container opening where the retainer plate will hold the refuse in the container when the container is detached from the packing unit. Heretofore such transfer has necessitated troublesome manual operations and has consumed considerable time.

Summary of the invention

The present invention provides novel means for guiding the movable container into operative relationship at the front of the packer and for automatically latching the container in such position by mechanism which can be easily released by a simple lever movement on one side of the mechanism only. Heretofore it has been necessary for workmen to perform manual operation on both sides when latching and also when releasing, usually involving the release of hooks, cables and chains.

A further object of the invention is to provide swingable flap members on opposite sides of the container opening for releasably holding a retainer plate in said opening, said flap members being automatically releasable at the start of a packing cycle in response to inward movement of the packer plate, and there being lever operated means for maintaining the flappers in inoperative position during cycling, said flappers being automatically swingable to a position to intercept the retainer plate at the end of a packing cycle, in response to a simple lever operation.

A further object of the invention is to provide novel means for preventing refuse from springing back over the packer member during cycling of the packer.

Other objects of the invention are to provide refuse packing mechanism which is strong and durable, simple in operation, and otherwise well adapted for the purposes described.

With the above and other objects in view, the invention consists of refuse packing mechanism, and all of its parts and combinations, as set forth in claims, and all equivalents thereof.

Brief description of the drawings

In the accompanying drawings, in which the same reference numerals designate the same parts in all of the views:

FIG. 4 is a perspective view of the packer looking principally at the discharge end and one of the sides;

FIG. 5 is a perspective view similar to FIG. 3 showing the retainer plate in position on the movable container and showing the container being moved toward latched position;

FIG. 6 is a fragmentary top view at the rear of the packer showing the actuator for one of the probe devices;

FIG. 10 is a fragmentary top view looking at one of the floor latches, one of the trunnions of a container being shown in section in latched position;

FIG. 11 is an irregulator sectional view taken on the line 11—11 of FIG. 10, parts being broken away;

FIG. 12 is a partially diagrammatic view showing the retainer plate in retained condition in the opening of a container and showing a portion of the packer plate in aligned position;

FIG. 13 is a similar view showing the container in latched position with the packing unit; and FIG. 14 is a similar view showing the packer plate fully inserted in the container, having picked up the retainer plate, and showing a flap member in retainer plate-releasing position.

Description of the preferred embodiments

Figure 1:
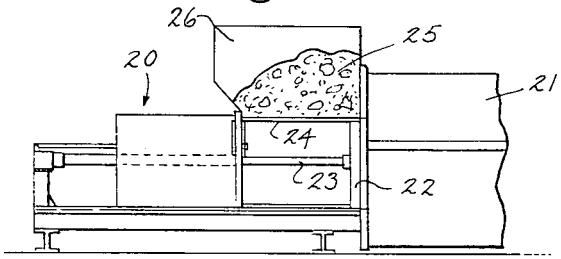
FIG. 1 is a partially diagrammatic side elevational view showing the packer unit in inactive condition with a portion of a movable container connected thereto, a part of the side wall being broken away.
Figure 2:
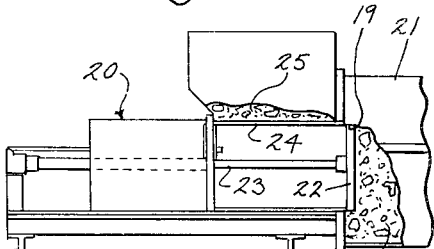
FIG. 2 is a similar view showing the end of a packing stroke.

Referring more particularly to the drawings, first to FIGS. 1 and 2, the numeral 20 designates a packer unit and the numeral 21 a movable container. The packer is stationary and includes a packer plate 22 which is reciprocated by an hydraulic ram 23, there being a cover or top closure 24 which is movable with the packer plate 22 and which, when in the position of FIG. 1, closes the charging chamber of the packer so that refuse 25 deposited in the hopper 26 is temporarily supported on the top closure 24. When the ram is moved to the left from the position of FIG. 1 it will pull the packer plate 22 and closure 24 to the left to allow the refuse 25 from the hopper to fall into the charging chamber in front of the packer plate. Thereafter on the forward stroke of the ram the packer plate 22 will ram the refuse into the opening 19 of the tailgate 19' of the detachable container 21 as shown in FIG. 2, the container being latched to the front of the packer in a manner to be hereinafter described. The tailgate is pivoted to the container as at 14.

Figure 9:
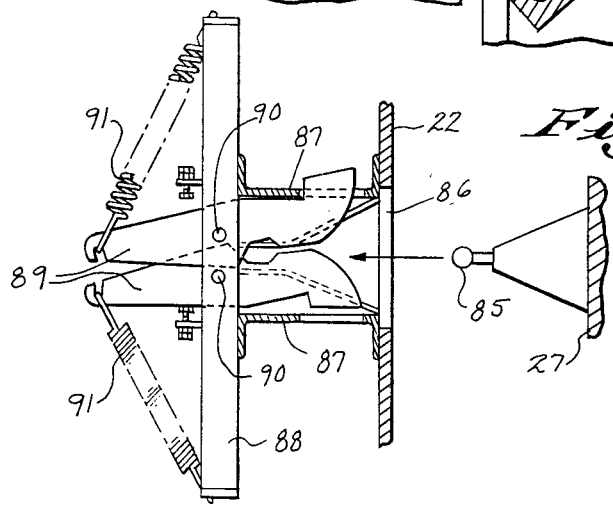
FIG. 9 is a fragmentary vertical sectional view through the packer plate and through a portion of the retainer plate showing mechanism for latching the retainer plate to the front of the packer plate.

It is part of the operation that a retainer plae 27 (see FIG. 5 where the retainer plate is closing the container opening) be temporarily held on the front of the packer plate 22, in the manner shown in FIG. 9, during packing movement, as will be hereinafter described in greater detail. This retainer plate 27 is adapted to be transferred to the front of the container opening as shown in FIG. 5 after the container has been fully loaded, to prevent the compressed refuse from falling out of the container after the container is separated from the packer.

The packer unit

Referring now to FIG. 4, the packer unit includes a charging chamber having side walls 28, a bottom wall 29, and a header bar 30. Horizontal guides 31 project from the walls 28 and coact with openings 32 in the sides of the packer plate to guide the latter in its reciprocal movement.

Slidably mounted on each of the outer sides of the packer unit is a bar 33 having its outer end connected to a probe block 34. The rear end of each slide bar projects rearwardly beyond the last upright frame channel 37 as at 38, and is adapted to be engaged by an abutment head 39 of a bolt 40 which is adjustably carried by a laterally-projecting arm 41. The latter is supported by a rod 41' projecting from the rear end of a movable portion 42 of the packing mechanism, as shown in FIG. 6. A spring 17 on each bar 33, acting on a collar 16, maintains the bars 33 in the withdrawn position of FIG. 4 when the packer plate 33 is in retracted position. When the packer plate 22 has been moved to a position where it is about to enter the end of the container the abutment heads 39 engage the ends 38 of the rods 33 to move the probes 34 outwardly for a purpose to be hereinafter described. The springs 17 cause the return movement.

Projecting upwardly from the top of the front of the packer unit, as shown in FIG. 4 (see also FIGS. 7 and 8), are bearing supports 43 within which a rock shaft 44 is journalled. The rock shaft rigidly carries locking lugs 45. When the handle 46 is in the down position of FIG. 4 the locking lugs 45 are in a forwardly-projecting position, as shown in FIG. 4. If, however, the handle 46 is swung to a raised position, then the locking lugs 45 are rocked to an upright position. The purpose of these locking lugs will be hereinafter described. Latches 15 may be pivoted into and out of a position to latch the lugs 45 in upright position.

Figure 3:
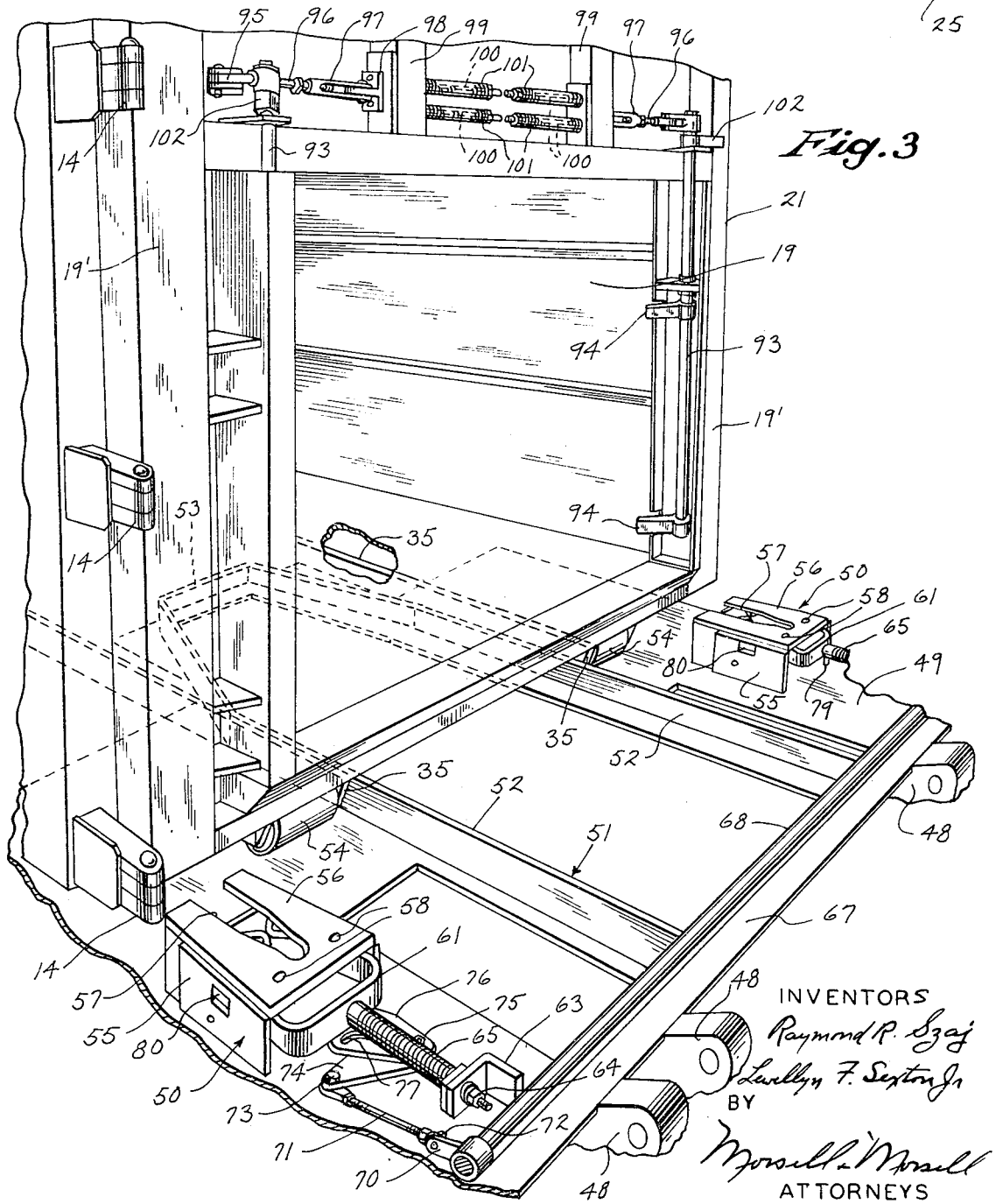
FIG. 3 is a fragmentary perspective view showing the receiving end of a container, with the container being moved into position on the guiding extension which projects from the packer, the packer being omitted.

Pivoted to the front of the packer unit 20 by pins 47 which extend removably through ears 48 is a floor plate extension 49, only part of which is shown in FIG. 4. The rest of the plate extension is illustrated in FIG. 3. The plate extension 49 supports latch units 50, one on each side, and a guiding frame 51. The guiding frame includes side rail portions 52 and a tapered forward nose 53. The longitudinal members 35 projecting from the bottom of the container 21 are adapted to be guided by the tapered nose portion 53 of the guiding frame 51 to the position shown in FIG. 3 so that, as the container is moved toward the packer, it will be guided by the rails 52 into properly-aligned position. The pivot pins 47 permit the floor of the packing unit to be blocked up at the end opposite the pins 47, to bring about an alignment with the angle of the floor of the container.

The floor latches

Referring now to FIGS. 10 and 11, each floor latch 50 includes side walls 55 and a top 56, there being a forwardly-opening slot 57 in the top. Pivotal on vertical pins 58 are latching elements 59 which are shaped to embrace and hold the king pins 60 which project from the bottom of the container 21 on opposite sides, as shown in FIG. 5. Each latch assembly also includes a yoke 61 having a rod 62 projecting from its rear through an eye in a fixed bracket 63. The outer end of the rod has an adjustable stop nut 64, and a spring 65 surrounding the rod normally urges the yoke to the position shown in FIG. 10.

Pivoted for rocking movement in bearings 66, which are supported on a channel member 67 (see FIG. 4) is a rock shaft 68 which is adapted to be rocked by hand lever 69. Rigidly projecting from the rock shaft 68 are levers 70 having their forward ends pivotally connected to the ends of links 71 as at 72 (see FIG. 11). The forward end of each link 71 is pivotally connected as at 73 to a corner of a plate 74 (see FIG. 10), which plate has a corner rigidly mounted on a pivot pin 75. Also rigidly mounted on the pivot pin 75 is one corner of a toggle plate 76 which is rigidly connected to plate 74, the latter having a curved slot 77 with an offset end 78. A pin 79 projecting downwardly from a projection at the rear of each yoke 61 coacts with the slot 77 in the toggle plate 76. With this arrangement, when the lever 69 of FIG. 4 is pulled downwardly, it will exert a pull on the links 71 and cause pivoting of the plates 76. This acts through the slot 77 to pull the yoke 61 outwardly (toward the packer) to a position where the sides of the yoke are no longer between the latching elements 59 and the sides 55 of the latch. This then permits the forward outer corners of the latching elements to be pivoted laterally outwardly through openings 80 in the sides of the latches (see FIG. 5), thus releasing the king pins 60. The pins 79 will engage the offset ends 78 of the slots to hold the yokes 61 in withdrawn position.

In reverse operation, when the container is being pushed toward the latches as in FIG. 5, there is a safety plate 81 for each latching unit which is spring urged to an up position to hold the latching elements 59 in spread condition ready to receive the king pins 60. As the king pins enter the slots 57 of the latch members the lower ends of the king pins push the plates 81 down on the spring pivots 82, the plates 81 being spring urged to the up position. These safety plates, when the king pins are not in latched position, merely hold the latching elements in separated condition with the corners 59' projecting into the openings 80 to prevent the spring 65 from urging the yokes into the position of FIG. 10 where spreading of the latches would be prohibited. When the king pins 60 are in the position shown in FIGS. 10 and 11, then the container is securely latched to the front of the packer in preparation for the packing cycle.

The retainer plate

Figure 8:
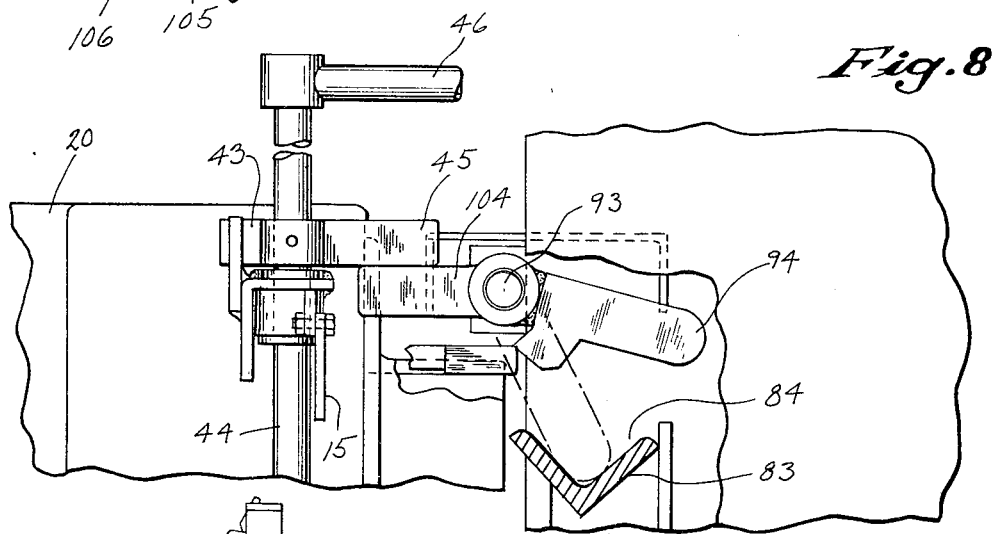
FIG. 8 is a fragmentary top view of mechanism similar to that illustrated in FIG. 7 but looking down on the opposite side of the devices, parts being broken away to show a flap member in two positions.

The retainer plate 27 is adapted to be transferred from a position closing the front of the container, as in FIG. 5, to a position where it is mounted on the front of the packer plate 22 for movement therewith during the packing cycle. Referring to FIG. 5, the retainer plate has V-shaped channels 83 on each side, the interiors of which form V-shaped upright grooves 84, as shown in FIG. 8 and as also shown in FIGS. 12, 13 and 14. These V-shaped grooves on each side are for the purpose of receiving pivoted flap members 94 on the container, as will be hereinafter described.

The face of each retainer plate has outwardly-projecting, horizontal latching rods 85 (see FIG. 5) which are adapted to enter spaced openings 86 on the face of the packer plate (FIG. 4) to engage latching elements behind said openings. FIG. 9 discloses a fragment of the retainer plate 27 and one of the latching rods 85 about to enter one of the openings 86 on the packer plate 22. Supported behind the packer plate on brackets 87 is a frame 88 to which latching elements 89 are pivoted as at 90. Springs 91 connected between the inner ends of the latching elements and the upper and lower ends of the frame 88 tend to urge the latches to the latching position shown in FIG. 9. When the retainer plate is moved against the packer plate 22 the latching rods 85 will enter the openings 86 and snap into the latching recesses 92 to be removably retained so that the retainer plate is removably held on the packer plate during the packing cycle.

The releasable retainer plate holding mechanism on the container

Referring now to FIG. 3, there is a vertical shaft 93 journalled along each side of the front opening of the container. Each shaft rigidly carries a pair of appers 94. Rigidly secured to the upper end of each shaft is a lever 95 and to the outer end of each lever one end of a link 96 is pivoted. The links 96 are adjustably connected to members 97 which are in turn pivotally connected to plates 98. Projecting from each plate 98 through guiding openings in the posts 99 are rods 100, there being a spring 101 around each rod. The springs normally urge the flappers 94 to the retainer plate holding position shown in FIG. 12. Also rigidly carried by each shaft 93 is a locking lug 102.

When an unloaded container is being returned to the packer to be refilled, the retainer plate 27 is covering the front opening, as in FIG. 5, and is releasably held in this position by the flappers 94 engaging the V-grooves 84 in the sides of the retainer plate 27, said flappers being movable in the clearance spaces between the sides of the container opening 19 and the sides of the retainer plate as shown in FIGS. 12–14. This position is partly illustrated in FIG. 12 where one of the flappers 94 is shown in engagement with the V-groove 84 to hold the retainer plate on the container. As the container approaches from the right, as shown in FIG. 12, the cutouts 36 on the packer frame will straddle the flappers as shown in FIG. 13. As the packer plate moves forwardly, the flappers 94 will be swung by the sides 107 (FIG. 14) of the packer plate to a position along said sides. Thereafter the abutment members 39 of FIG. 6 will push the rear ends of the slide bars 38 and cause the probe members 34 to move forward and engage the cam projections 103 of the flappers, as shown in FIG. 14, to move the from the sides of the packer plate, as shown in FIG. 14. flappers to an inactive position spaced a short distance It is not essential that probes be employed to carry out this function, as this may be accomplished by forward edges of the side walls 28 (FIG. 4) if the cutouts 36 are eliminated. This latter arrangement, however, requires special positioning of the packer plate in an extended position while the container is being attached to the packer. When the movable probes 34 are employed as in the embodiment illustrated, the container may be connected to the packer while the packer plate is withdrawn within the packer, and this is advantageous. Where the probes 34 are employed, their function of holding the flaps in the position of FIG. 14 is taken over by the locking lugs 45, as will be hereinafter explained in the following paragraph. By this time, however, the latching rods 85 on the retainer plate have latched into the latches within the openings 86 of the packer plate (see FIG. 9) so that the retainer plate has now been transferred to the front of the packer plate.

Figure 7:
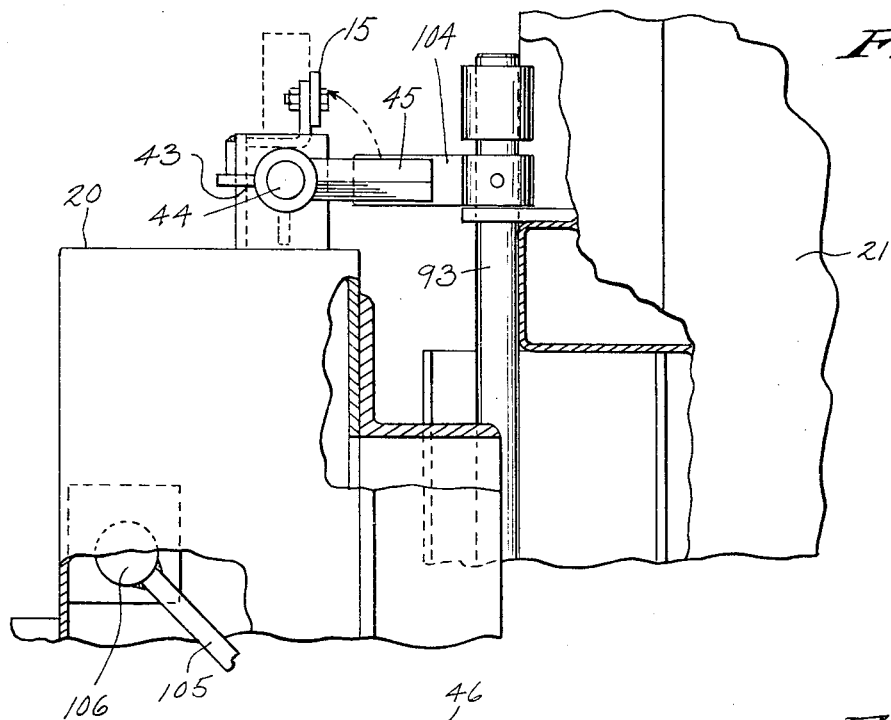
FIG. 7 is a fragmentary side elevational view looking at the upper portion of the front of a container and showing a portion of the packer in connected position.

Before cycling of the packer begins it is necessary to pull down on the lever 46 of FIG. 4 to bring the locking lugs 45 to the horizontal position of FIG. 4. This movement is also illustrated in FIGS. 7 and 8 where the locking lugs 45 are shown in full lines in the horizontal position to prevent clockwise movement of the shafts 93 for the flappers (see FIG. 8). Such movement is prevented by the fact that the complementary locking lugs 104 engage the locking lugs 45 to prevent clockwise movement of the shaft 93. Thus the flappers 94 are locked in the full line separated, out-of-the-way position of FIGS. 8 and 14 to which they have been temporarily moved by the probes so that the flappers do not interfere with the reciprocating movement of the packer member and retainer plate connected thereto or scrape thereagainst The locking lugs 45 and shaft 44 may, of course, be mounted on the container instead of on the packer. With the parts in the relative positions of FIG. 14, and with the container empty at the start, cycling of the packer can now be carried out. During such cycling the retainer plate remains on the front of the packer plate 22 to move therewith.

After the container 21 has been filled and it is desired to close the front opening of the removable container 21, then with the packer plate in the fully extended position of FIG. 14, the handle 46 (FIG. 4) is pushed upwardly to raise the locking lugs 45 to the upright position. This releases the complementary locking members 104 to FIGS. 7 and 8, and the springs 101 at the top of FIG. 3 act through the links 96 and levers 95 to rock the shafts 93 in a clockwise direction (referring to FIG. 8) to cause the flappers 94 to engage the V-grooves 84 when said grooves arrive at the position of FIG. 13 in retracting movement. This then holds the retainer plate over the opening at the front of the container as in FIG. 5. Further retraction movement of the packer member (toward the left as in FIG. 12) causes the locking rods 85 on the front of the retainer plate to pull out of the scissors latches of FIG. 9 to free the retainer plate from the packer plate.

Referring to FIG. 4, there are curtains 105 pivoted as at 106 to the header bar 30. These curtains are adapted to ride along the top of the cover member 24 (which cover is shown in FIG. 1—the curtains not being shown in FIG. 1) as the packer is moving forwardly to close the space above the top of the packer plate. FIG. 7 shows the upper portions of the curtains in the angled position which the curtains assume as the packer is in extended position. Thus during packing the curtains 105 prevent refuse which might spring back out of the container opening from entering the cavity in the packing unit above the packer element. This is important because if there is a chute leading to the packer hopper 26 of FIG. 1, material which might spring back from the container opening might jam up the chute and hopper and interfere with the entry of new material.

Summary of operation

When an empty container has been returned from a dump by a transporting vehicle it is removed from the transporting vehicle in a position where it can be rolled on its rollers 54 up to the packing unit. In most instances the packing unit can be so located that the transporting vehicle can unload the container close to final position. During final positioning, the tapered nose 53 of the guiding device 51 of FIG. 3 is straddled by longitudinal members 35 at the bottom of the container and the latter are then guided to the sides of the rails 52 as shown in FIG. 3. While FIG. 3 shows the retainer plate removed from the container, this retainer plate is actually in the position shown in FIG. 5 when the empty container is being moved toward the packing unit.

Referring now to FIG. 5, further movement of the container will cause the king pins 60 (one on each side) to enter the slots 57 of the latches 50. As they enter they will push the pivoted safety plates 81 down to the position shown in FIG. 11. The yokes 61 are in the withdrawn position, caused by manual operation of the lever 69. Prior to the engagement of the king pins 60 with the safety plates 81, the latter have held the latching elements 59 in spread condition to admit the king pins 60 to the latching position of FIGS. 10 and 11. Thereafter the manual lever 69 is manipulated to rock the shaft 68 so that the springs 65 can push the yokes 61 into the position shown in FIG. 10, between the latching elements and the sides 55 of the latch housings. This then serves to lock the king pins in the position shown in FIG. 10 and hence to firmly lock the container to the packing unit in the relative position shown in FIGS. 1 and 2. The parts are also in the position shown in FIG. 13, with the cutouts 36 in the front edges of the side walls of the packing chamber straddling the pivotal flaps as shown in FIG. 13.

Next the ram 23 is extended to move the packer plate 22 into the container from the position shown in FIG. 13 into the container as in FIG. 2. During such movement the locking rods 85 on the retainer plate 27 enter the openings 86 (FIG. 4) and are engaged by the scissor latches of FIG. 9. During such movement the probe members 34 have ben kicked forwardly due to the abutment heads 39 acting on the rear ends of the slide bars 38. The probes 34 act on the cam members 103 in the manner shown in FIG. 14 to swing the flappers 94 in a clockwise direction as shown in FIG. 14 so that the retainer plate, which has previously been retained in the opening of the container as in FIG. 5 is now free of the container and can move in and out with the packer plate 22. As soon as the parts are in the position of FIG. 14 the manual lever 46 is moved into the position shown in FIG. 4 so that the locking lugs 45 are moved to the position of FIGS. 7 and 8 to lock the flappers 94 in the laterally withdrawn position of FIG. 14.

The cycling of the packer can now be carried out until the container 21 has been filled with refuse, it being noted that the refuse will be compressed into the container to provide a well compacted load. When the container will take no more refuse, then the lever 46 is raised to elevate the locking lugs 45 and thereby release the complementary locks 104 of FIG. 8. This then permits the flappers 94, urged by the action of the springs 101 (see the top of FIG. 3) to swing against the sides of the packer. As the packer is withdrawn for the last time the flappers 94 will then swing automatically into the V-grooves 84 as shown in FIG. 13 to hold the retainer plate to the container in the position shown in FIG. 5. Further retraction of the packer plate will pull the packer plate latches free of the latching rods 85 of the retainer plate. Thus the retainer plate is completely transferred to the container.

Next the manual lever 69 is manipulated to pull the yokes 61 of the latches 50 (FIGS. 10 and 11) toward the left so that the latching elements 59 can pivot laterally with their forward outer corner portions entering the openings 80. This allows the latching elements 59 to spread sufficiently to release the king pin 60 when the container 21 is pulled away from the packing unit. The container may then be loaded on a vehicle and taken to a dump to be later returned for refilling.

Various changes and modifications may be made without departing from the spirit of the invention, and all of such changes are contemplated as may come within the scope of the claims.

What we claim is:

1. In a refuse packing mechanism wherein there is a packer with a discharge opening and with a reciprocable packer plate and wherein there is a portable container with a receiving opening through which refuse is adapted to be rammed by said packer plate when said receiving opening is in registration with the discharge opening of the packer, said receiving opening having opposite sides, the improvement comprising a retainer plate releasably mounted on the packer plate and of a size to fit within and through said container opening, said retainer plate having side edges and there being clearance spaces between the sides edges of the retainer plate and said sides of the container opening when the retainer plate is in position within the container opening, and said side edges of the retainer plate having groove means opening toward the sides of the container opening, and flappers swingably mounted on the sides of the container opening for transverse swinging movement within said clearance spaces into and out of said groove means to releasably hold the retainer plate within the opening of the container.

2. Refuse packing mechanism as claimed in claim 1 in which the groove means are outwardly opening V-shaped channels.

3. Refuse packing mechanism as claimed in claim 2 in which the flappers have free ends which are swingable into and out of the V-grooves.

4. Refuse packing mechanism as claimed in claim 1 in which there are cooperating latch means on the retainer plate and packer plate for releasably connecting the retainer plate to the packer plate.

5. Refuse packing mechanism as claimed in claim 1 in which there is a rearwardly projecting cover projecting from the upper edge of the packer plate and in which there are curtains swingably mounted on the packer above said cover and of a length to drag on said cover as the packer plate is moved forwardly.

6. In refuse packing mechanism wherein there is a packer with a discharge opening and with a reciprocable packerplate and wherein there is a portable container with a receiving opening through which refuse is adapted to be rammed by said packer plate when said receiving opening is in registration with the discharge opening of the packer, the improvement comprising a retainer plate for said receiving opening of the container releasably mounted on the packer plate and having groove means on opposite sides, and swingably mounted flappers on the container positioned to swing in and out of said groove means to releasably hold the retainer plate on the container, in which there are rock shafts journalled on opposite sides of the receiving opening of the container and in which the flappers are rigidly mounted on said rock shafts.

7. Refuse packing mechanism as claimed in claim 6 in which there are locking elements rigidly connected to said rock shafts and in which there are manually operable locking elements movably mounted on the packer and cooperable in one position with said locking elements on the rock shafts to maintain the flapper members in positions where they are disengaged from the retainer plate.

8. Refuse packing mechanism as claimed in claim 6 in which there are locking elements rigidly connected to said rock shafts and in which there are manually operable movable locking elements cooperable in one position with said locking elements on the rock shafts to maintain the flapper members in positions where they are disengaged from the retainer plate.

9. Refuse packing mechanism as claimed in claim 6 in which there are locking elements connected to said rock shafts, and in which there is manually operable locking means cooperable in one position with said locking elements on the rock shaft to maintain the flappers in positions where they are disengaged from the retainer plate, and in which there is spring means normally urging said flappers to retainer-plate-engaging position.

10. In refuse packing mechanism wherein there is a packer with a discharge opening and with a reciprocable packer plate and wherein there is a portable container with a receiving opening through which refuse is adapted to be rammed by said packer plate when said receiving opening is in registration with the discharge opening of the packer, the improvement comprising a retainer plate for said receiving opening of the container releasably mounted on the packer plate and having groove means on opposite sides, and swingably mounted flappers on the container positioned to swing in and out of said groove means to releasably hold the retainer plate on the container, in which there is probe means movably mounted on the packer and movable forwardly in response to a predetermined forward movement of the packer plate for moving the flappers to an inactive position and for temporarily holding them in this position while the probe means is in said forwardly moved position.

11. Refuse packing mechanism as claimed in claim 1 in which there is spring means normally urging said flappers to retainer plate engaging position.

12. Refuse packing mechanism as claimed in claim 10 in which said flappers have cam elements positioned to be engaged by said probe means for causing movement of the flappers to said inactive position as the retainer plate is pushed inwardly by said packer plate.

13. Refuse packing mechanism as claimed in claim 12 in which there is means for releasably coupling the retainer plate to the packer plate as the flappers are being moved to disengaging position.

14. In refuse packing mechanism wherein there is a packer with a discharge opening and a reciprocable packer plate, and wherein there is a portable container with a receiving opening through which refuse is adapted to be directed by said packer plate, the improvement comprising a floor plate projecting forwardly from the discharge opening of the packer and cooperating guiding means on the floor plate and container to direct the receiving opening of the container toward a position of registration with the discharge opening of the packer, latches on said floor plate, each latch including a pair of pivotally mounted latching elements, latching pins projecting from the container and positioned to be engaged by said latching elements when the container is in operative position with its receiving opening in registration with the discharge opening of the packer, and a yoke having arms which are projectible to a position to embrace said latching elements and releasably prevent opening movement thereof.

15. Refuse packing mechanism as claimed in claim 14 in which there is manually operable means for moving said yoke to latch-releasing position.

16. Refuse packing mechanism as claimed in claim 14 in which each latch includes spaced stationary side members having openings therein between which the latching elements are pivoted, with said latching elements having outer portions positioned to project through said openings when the latching elements are in open position, and in which the arms of the yoke are projectible between the latching elements and said side members to releasably prevent opening movement of the latching elements.

17. In refuse packing mechanism wherein there is a packer with a discharge opening and a reciprocable packer plate, and wherein there is a portable container with a receiving opening through which refuse is adapted to be directed by said packer plate, the improvement comprising a floor plate projecting forwardly from the discharge opening of the packer and cooperating guiding means on the floor plate and container to direct the receiving opening of the container toward a position of registration with the discharge opening of the packer, latches on said floor plate, and latching elements projecting from said container and positioned to be engaged by said latches when the container is in operative position with its receiving opening in registration with the discharge opening of the packer, in which there is spring means on the latches on the floor plate normally urging the latches to closing position, and in which there is safety means embodied in the latches for maintaining the latches in open position against the urging of said spring means when the container is removed, and which safety means are positioned to be automatically disengaged when contacted by the latching elements of the container.

18. In refuse packing mechanism wherein there is a packer with a discharge opening and with a reciprocable packer plate and wherein there is a portable container with a receiving opennig through which refuse is adapted to be rammed by said packer plate when said receiving opening is in registration with the discharge opening of the packer, the improvement comprising a retainer plate for said receiving opening of the container releasably mounted on the packer plate and having groove means on opposite sides, and swingably mounted flappers on the container positioned to swing in and out of said groove means to releasably hold the retainer plate on the container, in which there is means for maintaining the flappers in inactive position to prevent re-engagement of the flappers with the groove means on the retaining plate when the packer is being retracted through the receiving opening in the container.

19. In refuse packing mechanism wherein there is a packer with a discharge opening and with a reciprocable packer plate and wherein there is a portable container with a receiving opening through which refuse is adapted to be rammed by said packer plate when said receiving opening is in registration with the discharge opening of the packer, the improvement comprising a retainer plate for said receiving opening of the container releasably mounted on said packer plate and having groove means on opposite sides, and swingably mounted flappers on the container positioned to swing in and out of said groove means to releasably hold the retainer plate on the container, in which there is means on the packer engageable with the flappers to move the latter to inactive position.

20. In refuse packing mechanism wherein there is a packer with a discharge opening and with a reciprocable packer plate and wherein there is a portable container with a receiving opening through which refuse is adapted to be rammed by said packer plate when said receiving opening is in registration with the discharge opening of the packer, the improvement comprising a retainer plate for said receiving opening of the container releasably mounted on the packer plate and having groove means on opposite sides, swingably mounted flappers on the container positioned to swing in and out of said groove means to releasably hold the retainer plate on the container, said flappers being positioned so as to be automatically moved to retainer-plate-releasing position in response to a predetermined forward movement of the packer plate, and means for releasably holding the flappers in said position.

References Cited

UNITED STATES PATENTS

| | | | |
|---|---|---|---|
| 3,065,586 | 11/1962 | Chiringhelli | 53—124 |
| 3,129,657 | 4/1964 | Farley et al. | 100—214 |
| 3,229,618 | 1/1966 | O'Connor | 100—229 XR |
| 3,229,622 | 1/1966 | French et al. | 100—214 |
| 3,250,414 | 5/1966 | Pioch | 214—41 XR |
| 3,416,701 | 12/1968 | Kramer et al. | 220—55 |

FOREIGN PATENTS 985,462   3/1965   Great Britain.

BILLY J. WILHITE, Primary Examiner

U.S. Cl. X.R.

100—245; 214—41; 220—55